United States Patent

[11] 3,590,203

| [72] | Inventors | Harold J. Gieffers<br>Hinsdale;<br>Larry M. Rogers, Chicago, both of, Ill. |
|---|---|---|
| [21] | Appl. No. | 796,014 |
| [22] | Filed | Feb. 3, 1969 |
| [45] | Patented | June 29, 1971 |
| [73] | Assignee | Continental Can Company, Inc.<br>New York, N.Y. |

[54] FIXED GAP AUXILIARY ROLL FOR SEAM WELD ELECTRODE LEVER
10 Claims, 3 Drawing Figs.

[52] U.S. Cl. ................................................ 219/66,
219/64, 219/79, 219/82
[51] Int. Cl. .................................................. B23k 11/30
[50] Field of Search ........................................ 219/66, 59,
64, 79, 81, 82, 84; 228/8, 10, 11

[56] References Cited
UNITED STATES PATENTS

| 2,236,998 | 4/1941 | Gillette | 219/81 |
| 904,771 | 11/1908 | Fulton | 219/64 |
| 1,452,762 | 4/1923 | Schroeder | 219/66 |
| 1,554,273 | 9/1925 | Gibb | 219/81 |
| 2,957,975 | 10/1960 | Pearson | 219/81 |

FOREIGN PATENTS

| 690,542 | 4/1940 | Germany | 219/81 |

Primary Examiner—J. V. Truhe
Assistant Examiner—L. A. Schutzman
Attorneys—Mason, Porter, Diller and Brown and Diller, Brown, Ramik & Holt ABSTRACT: This disclosure relates to an electrode support for a welding apparatus for welding lap seams of tubular members passing along a support at regularly spaced intervals. The welding apparatus includes a fixed electrode and a movable electrode, and the movable electrode is supported in such a manner wherein although it is constantly urged towards the fixed electrode, engagement of the movable electrode with the fixed electrode is prevented by the existence of an adjacent tubular member. This is accomplished by the support for the movable electrode having a stop member which is engageable with an adjacent tubular member.

PATENTED JUN29 1971 3,590,203

INVENTORS
HAROLD J. GIEFFERS
& LARRY M. ROGERS
BY Mason, Porter, Diller & Brown
ATTORNEYS

FIXED GAP AUXILIARY ROLL FOR SEAM WELD ELECTRODE LEVER

This invention relates in general to new and useful improvements in welding apparatus for welding lap seams of tubular members, and more particularly to an electrode mounting apparatus.

When tubular members of relatively short length are being welded, the problem of impact on the electrode arises. As a previously welded tubular member passes from between the electrodes, since the electrodes are continuously urged together, the movable electrode is immediately forced into pressure contact with the fixed electrode. This, of course, results in an immediate impact between the two electrodes. In addition, it requires a switching off of the welding current whereas when the voltage of the welding power supply is sufficiently low, arcing between the spaced electrodes will not occur and power turnoff will not be required. Furthermore, when a next following tubular member, which is to be welded, passes between the two roller electrodes, it is necessary that the movable electrode ride up the leading edge of the tubular member with relatively great impact on the movable electrode.

According to this invention, it is proposed to provide a support for the movable electrode which is of a construction wherein when the movable electrode rides off a welded tubular member, while there will be limited movement of the movable electrode towards the fixed electrode, the movement will be very slight and the two electrodes will not come into contact with one another. Furthermore, inasmuch as the movement of the movable electrode towards the fixed electrode is relatively slight, the movable electrode will freely ride up on the leading edge of the next tubular member to be welded, thereby eliminating the previous impact contact between the tubular member to be welded and the electrodes.

A principal feature of this invention is the provision of a support for the movable electrode, which support has a stop which is so positioned relative to the movable electrode whereby when the space between adjacent tubular members is aligned with the electrodes, the stop is riding on an adjacent tubular member and prevents the moving together of the electrodes except for a minute amount which is specifically provided for in order to assure constant contact of the movable electrode with a tubular member during a welding operation.

Another feature of this invention is to provide a support for a movable electrode wherein the support is provided with a stop which, in the operative position thereof, is engaged with an adjacent tubular member and wherein the stop is normally spaced from such a tubular member whereby the movable roller electrode is brought into pressure contact with the tubular member being welded without any interference whatsoever from the stop.

A further feature of this invention is the provision of a support for a movable electrode wherein the stop is in the form of a roller which freely rolls against the associated tubular member and which roller is baked up by an internal roller.

A still further feature of this invention is the adjustable mounting of the stop relative to the support for the movable electrode whereby the relative positions of the movable electrode and the stop may be readily adjusted.

With the above and other objects in view that will hereinafter appear, the nature of the invention will be more clearly understood by reference to the following detailed description, the appended claims and the several views illustrated in the accompanying drawing.

Figure 1:
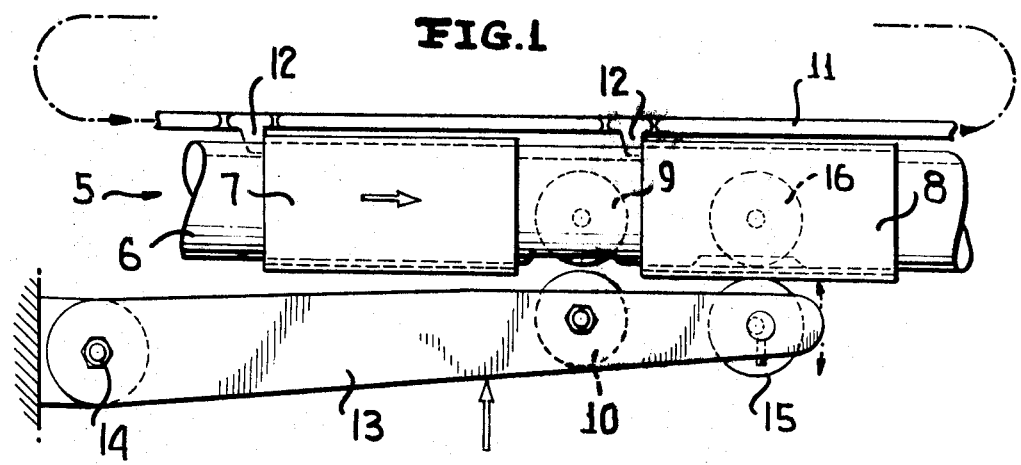
FIG. 1 is a schematic side elevational view of a welding apparatus for tubular members and specifically shows the space between adjacent tubular members as being aligned with the electrodes and the movable electrode being held in spaced relation with respect to the fixed electrode.

Referring now to the drawing in detail, it will be seen that there is illustrated welding apparatus for welding lap seams of tubular members, the welding apparatus being generally referred to by the numeral 5. The welding apparatus 5 includes an elongated horn 6 which forms a support for tubular members to be welded, such as the tubular member 7, and tubular members which have been welded, such as the tubular member 8.

It is to be understood that the tubular members have lap seams which are to be welded, and therefore, welding is accomplished by means of a fixed electrode 9 and a movable electrode 10. The electrodes 9 and 10 are of the roller type and are disposed in opposed relation. The electrode 9 is mounted within the horn 6 for engagement with the internal surface of the tubular member to be welded, while the roller electrode 10 is disposed externally of the horn 6 and is adapted to engage the exterior surface of a tubular member to be welded.

The tubular members are moved sequentially along the horn 6 in predetermined spaced relation. This may be accomplished in any manner, but in accordance with FIGS. 1 and 2, is accomplished by means of an endless conveyor chain 11 having spaced dogs 12 thereon engaging the trailing ends of the tubular members.

In accordance with this invention, the movable electrode 10 is carried by a suitable support for movement towards and away from the fixed electrode 9. The support is continuously urged towards the electrode 9 whereby as soon as the fixed electrode 10 rolls off of the welded tubular member 8, it has a tendency to move towards and engage the fixed electrode 9. In accordance with this invention, the support, which is identified by the numeral 13, is in the form of an elongated arm which is pivotally mounted as at 14. Means (not shown) are engaged with the arm 13 for continuously urging the arm 13 under pressure towards the horn 6.

In accordance with this invention, movement of the movable electrode 10 towards the fixed electrode 9 is controlled by means of a stop in the form of a roller 15. The roller 15 is carried by the arm 13 and is spaced in the direction of movement of the tubular members a distance in excess of the spacing between adjacent tubular members.

Figure 2:
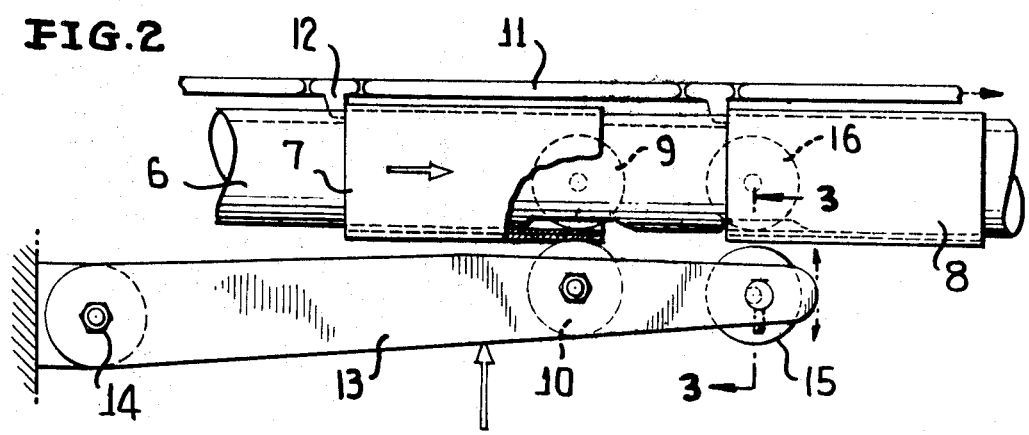
FIG. 2 is a schematic side elevational view similar to FIG. 1 and shows the movable electrode after it has ridden up onto the tubular member to be welded and with the stop for the support for the movable electrode being disposed in an inoperative position.

With particular reference to FIG. 1, it will be seen that when the space between adjacent tubular members is aligned with the electrodes 9 and 10, a previously welded tubular member 8 is positioned in alignment with the roller 15 and is engaged by the roller 15. The engagement of the roller 15 with the welded tubular member 8 prevents further movement of the movable electrode 10 towards the fixed electrode 9, and the movable electrode 10 remains spaced a predetermined distance from the fixed electrode 9.

At this time it is pointed out that it is undesirable for the roller 15 to force the welded tubular member 8 into pressure contact with the horn 6. Accordingly, there is mounted within the horn 6 a roller 16 which is aligned with the roller 15 and which backs up the last welded tubular member 8 so as to permit the tubular member 8 to freely move along the horn 6.

Referring now to FIG. 2, it will be seen that although the roller 15 functions as a stop and prevents the movable electrode 10 from engaging the fixed electrode 9 when the space between adjacent tubular members are aligned with the electrodes, when the movable electrode 10 is in an operative position cooperating with the electrode 9 to form a welded seam on a newly presented tubular member 7, the roller 15 in no way controls the engagement of the electrode 10 with the tubular member 7. It is to be noted that notwithstanding the fact that a tubular member 8 may be positioned between the roller 15 and the roller 16, the roller 15 will be held out of engagement with the tubular member 8.

It will be readily apparent from the foregoing that the roller 15, in its function as a stop, while it does prevent the roller electrode 10 from engaging the roller electrode 9 and the spaces between adjacent tubular members are aligned with the electrodes, it in no way interferes with the welding operation. In addition, it will be seen that it spaces the movable electrode 10 sufficiently from the fixed electrode 9 whereby the next tubular member to be welded can freely pass between the electrodes 9 and 10 without impact on the electrode 10 and resultant bounce of the electrode 10.

Figure 3:
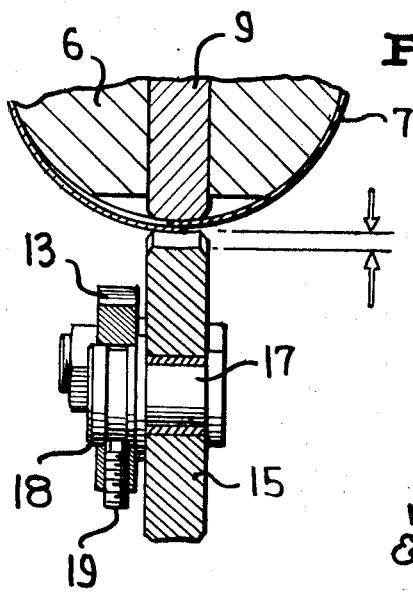
FIG. 3 is an enlarged fragmentary vertical sectional view taken along the line 3-3 of FIG. 2 and specifically shows the details of the adjustable mounting for the stop.

Referring now to FIG. 3 in particular, it will be seen that the roller 15 is adjustably carried by the arm 13 for movement towards and away from the roller 16. The mounting for the roller 15 includes a pin 17 on which the roller 15 is journaled for rotation. The pin 17 has an eccentric portion 18 which is rotatably journaled within the arm 13. The pin 17 is retained in an adjusted position by means of a setscrew 19 carried by the arm 13. It will be readily apparent that by rotating the pin 17 relative to the arm 13, the roller 15 may be moved towards and away from the roller 16 and thus provide for the desired relative position of the roller 15 with respect to the movable roller electrode 10.

It is also pointed out at this time that while the roller 15 has been illustrated as the roller which is adjustably mounted, if one so desires, the roller electrode 10 may be the adjustably mounted member. It will be readily apparent that by adjustably mounting the roller electrode 10, the same result would be obtained.

Although only a preferred embodiment of the invention has been specifically illustrated and described herein, it is to be understood that minor variations may be made in the electrode mounting, particularly in the details of the support therefor, without departing from the spirit of the invention.

We claim:

1. An apparatus for welding lap seams of moving spaced apart tubular members comprising a support for guiding tubular members along a predetermined path and means for serially moving tubular members along said support at regularly spaced intervals, opposed inner and outer electrodes, one of said electrodes being radially fixed and means supporting the other of said electrodes for radial movement towards and away from said fixed electrode with contact between said electrodes being possible in the absence of other structure, and electrode-positioning means limiting the movement of said other electrode towards said one electrode to a position spaced therefrom.

2. The apparatus of claim 1 wherein said electrode-positioning means has stop means engageable with an adjacent tubular member in the operative position of said stop means to prevent engagement of said electrodes with one another in the absence of a tubular member therebetween during a welding sequence.

3. The apparatus of claim 1 wherein said electrode-positioning means includes a roller engageable with an adjacent tubular member in the operative position of said roller to prevent engagement of said electrodes with one another in the absence of a tubular member therebetween during a welding sequence.

4. The apparatus of claim 1 wherein the means supporting the other electrode includes an electrode support carrying said other electrode, and said electrode-positioning means includes a stop projecting from said electrode support towards said path, the relative positions of said other electrode and said stop with respect to said path rendering said stop inoperative when a tubular member is disposed between said electrodes.

5. The apparatus of claim 4 wherein said stop is engageable with an adjacent tubular member in the operative position of said stop to prevent engagement of said electrodes with one another in the absence of a tubular member therebetween during a welding sequence.

6. The apparatus of claim 4 wherein said stop is engageable with an adjacent tubular member in the operative position of said stop to prevent engagement of said electrodes with one another in the absence of a tubular member therebetween during a welding sequence and is spaced from said other electrode a distance slightly greater than the spacing between adjacent tubular members.

7. The apparatus of claim 4 wherein said stop is engageable with an adjacent tubular member in the operative position of said stop to prevent engagement of said electrodes with one another in the absence of a tubular member therebetween during a welding sequence and is in the form of a roller.

8. The apparatus of claim 4 wherein said stop is engageable with an adjacent tubular member in the operative position of said stop to prevent engagement of said electrodes with one another in the absence of a tubular member therebetween during a welding sequence and is in the form of a roller, and a fixed backup roller is positioned within said path in opposition to said first mentioned roller to support in backing relation a tubular member when engaged by said first mentioned roller.

9. The apparatus of claim 4 wherein said electrode support is in the form of a pivotally mounted arm.

10. The apparatus of claim 4 wherein said electrode support has means for varying the relative projecting of said other electrode and said stop.